United States Patent
Hunter

(10) Patent No.: US 10,234,335 B2
(45) Date of Patent: Mar. 19, 2019

(54) THERMOCOUPLE RESISTANCE COMPENSATOR

(71) Applicant: THERMO-KINETICS COMPANY LIMITED, Mississauga (CA)

(72) Inventor: Michael Hunter, Mississauga (CA)

(73) Assignee: THERMO-KINETICS COMPANY LIMITED, Mississauga (CA)

( * ) Notice: Subject to any disclaimer, the term of this patent is extended or adjusted under 35 U.S.C. 154(b) by 457 days.

(21) Appl. No.: 14/700,233

(22) Filed: Apr. 30, 2015

(65) Prior Publication Data

US 2015/0316421 A1 Nov. 5, 2015

Related U.S. Application Data

(60) Provisional application No. 61/986,205, filed on Apr. 30, 2014.

(51) Int. Cl.
*G01K 7/10* (2006.01)

(52) U.S. Cl.
CPC ..................... *G01K 7/10* (2013.01)

(58) Field of Classification Search
CPC .. G01K 7/02; G01K 7/10; G01K 7/22; G01K 11/32; G01K 13/00; G01K 13/02; G01K 2205/04; G01K 2013/024; G01J 5/004; G01J 5/043; G01J 5/0821; H01R 4/023; H01R 4/029; H01R 43/28; B23K 31/02
See application file for complete search history.

(56) References Cited

U.S. PATENT DOCUMENTS

| | | | | |
|---|---|---|---|---|
| 3,486,127 A | * | 12/1969 | Beck | G05D 23/1906 330/256 |
| 3,684,172 A | | 8/1972 | Evalds | |
| 3,735,274 A | * | 5/1973 | Nelson | H03F 3/393 330/1 A |
| 3,825,733 A | | 7/1974 | White et al. | |
| 3,860,875 A | * | 1/1975 | Darnell | G01K 7/021 374/E7.016 |
| 4,475,103 A | | 10/1984 | Brokaw et al. | |
| 4,623,266 A | | 11/1986 | Kielb | |
| 4,936,690 A | | 6/1990 | Goetzinger | |
| 5,735,605 A | | 4/1998 | Blalock | |
| 6,158,885 A | | 12/2000 | Landis | |
| 8,344,475 B2 | | 1/2013 | Shaeffer et al. | |
| 2008/0125767 A1 | * | 5/2008 | Blaha | G01K 7/13 374/E7.014 |
| 2008/0291964 A1 | | 11/2008 | Shrimpling et al. | |
| 2009/0080490 A1 | | 3/2009 | Mowry, Jr. et al. | |
| 2010/0025811 A1 | | 2/2010 | Bronner et al. | |

FOREIGN PATENT DOCUMENTS

| | | |
|---|---|---|
| CA | 1084729 | 9/1980 |
| CN | 002645061 | 9/2004 |
| JP | 01237422 | 9/1989 |
| JP | 05001956 | 1/1993 |

* cited by examiner

*Primary Examiner* — Manish S Shah

(57) ABSTRACT

A compensator designed to function with any type of base metal thermocouple which reduces the measured source impedance of high resistance thermocouples to less than 100 ohms making them compatible with or readable by modern measuring instruments.

7 Claims, 1 Drawing Sheet

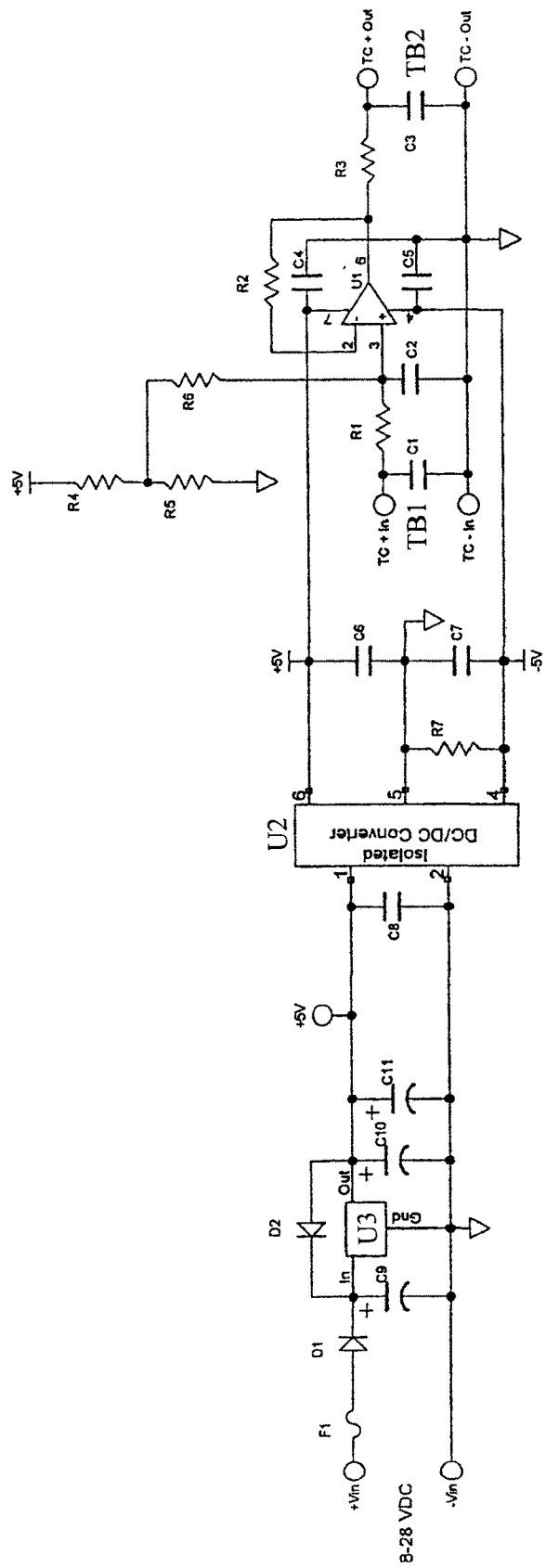

THERMOCOUPLE RESISTANCE COMPENSATOR

FIELD OF THE INVENTION

This invention relates to a device which reduces the measured source impedance of high resistance thermocouples to less than 100 ohms and thereby makes them compatible with modern measuring instruments. The compensator is designed to function with any type of base metal thermocouple.

BACKGROUND OF THE INVENTION

This invention relates to the use of thermocouples. A thermocouple is a temperature sensing element that operates on the principle that when two dissimilar metals are junctioned and the junction is heated, it produces a low voltage (millivoltage) which is proportional to the temperature.

Thermocouples have a predictable and repeatable relationship between temperature and voltage. They are used widely in higher temperature applications because they can withstand greater temperatures than resistance temperature detectors (RTDs), and are less expensive in most cases.

However, a significant problem has arisen with respect to the accurate temperature measurement of a thermocouple with high loop resistance (greater than 2,000 ohms).

One of the uses of a high resistance thermocouple is to take accurate temperature readings in downhole thermocouple applications. An investigation of these applications have discovered that many errors occur in the readings and that the errors are a function of the resistance of the thermocouple. In other words, the higher the resistance of the thermocouple, the larger the error either positive or negative.

Experiments have been conducted using many transmitters, PLCs to troubleshoot the problems with determining accurate temperature measurement.

Tests have been conducted using thermocouples of various resistances and at different temperatures. It was discovered that there is not any consistency other than the higher the resistance of the thermocouple, the larger the error.

The issue is the high loop resistance of the thermocouple and the inability of some instrumentation to process it accurately.

Most thermocouple measuring instruments will not correctly measure the voltage output of a high resistance thermocouple. Thermocouple resistance is normally low (<500Ω) and the instrument input impedance is normally high (>1 MΩ). The thermocouple voltage causes a current to flow in the input circuit. This causes a voltage change at the instrument terminals due to the voltage divider created by the two resistances, one of the thermocouple wires and the second of the instrument input circuit. The effect is negligible when the thermocouple resistance is low, but it becomes significant when the lead wire resistance increases (greater than 2,000 ohms).

The prior art has suggested to introduce a transmitter that has been tested and is known to work in the application between the wellhead and the input cards but in order to do so, 4-20 mA input cards rather than thermocouple input cards would have to be used. Retrofitting 4-20 cards for thermocouple input cards can be an expensive proposition. Not to mention the additional copper cable and the installation of it if not already present. It is further noted that not all transmitters will work.

Transmitters won't solve the problem. They are prone to the same problem of high input resistance as any other measuring instrument.

When a thermocouple is accessible, a transmitter can be installed near the hot end and the 4/20 mA output signal sent over a long distance using copper wire in lieu of more expensive thermocouple wire (also requires a current input signal conditioner instead of thermocouple at the receiving instrument). This is not applicable where the thermocouple location is inaccessible such as underground, or in an unfriendly environment such as an area that is exposed to radiation.

BRIEF DESCRIPTION OF THE DRAWINGS

FIG. 1 is a circuit drawing of the thermocouple resistance compensator.

DETAILED DESCRIPTION OF THE PREFERRED EMBODIMENTS

The inventor has found that the solution is to provide an impedance match between the thermocouple wire and the measuring instrument which presents a high resistance load for the thermocouple and a low source resistance for the instrument.

Accordingly, to this end, a compensator has been invented which when used with a high resistance thermocouple, allows for more accurate temperature measurements.

The compensator is placed between the thermocouple and the measuring instrument. It accepts a high resistance input and provides a low resistance output that modern instrumentation can deal with thereby providing an accurate temperature measurement of the thermocouples regardless of its resistance.

In addition, the compensator is a much less costly solution than supplying a transmitter for every thermocouple input as suggested by the prior art. This makes it useful in existing installations as well as in new installations.

To this end, in one of its aspects, the invention provides an impedance match between a thermocouple and its measuring instrument.

It has been found that the use of a compensator reduces the measured input impedance of high resistance thermocouples (greater than 2,000 ohms) to less than 100 ohms to make them compatible with modern measuring instruments. The compensator is designed to function with any type of base metal thermocouple and any type of measuring instrument.

By providing an impedance match between the thermocouple wire and the measuring instrument, this presents a high resistance load for the thermocouple and a low source resistance for the instrument.

Referring now to FIG. 1, there is shown the thermocouple resistance compensator of the present invention.

U1 is a precision operational amplifier which accepts a thermocouple level input signal connected between the circuit common and through the resistor R1 to the non-inverting input. The operational amplifier is configured as a voltage follower, unity gain, (G=1).

The operational amplifier is configured as a voltage follower which has the following characteristics. It a very high input impedance and a low output impedance which makes it suitable for high resistance voltage sources.

The Op Amp (U1) has the following specifications. It has stability in unity gain mode, Av=1 and a very low input offset voltage. It has a very low input offset voltage drift over the specified temperature range and a very low input bias current. It has a very low input noise specification with the output resistance of less than 100 ohms.

Resistor R1 and capacitors C1 and C2 provide minimal input signal filtering to keep the amplifier stable with the very long MIMS thermocouple connected. Resistor R1 also provides over voltage protection to the amplifier.

Resistor R2 provides op amp output feedback to the amplifier inverting input to maintain unity gain. R2 is also needed to prevent output instability or latch up from occurring when the output is being wired or touched by the installer.

Capacitors C3, C4 and C5 stabilize the operation of the amplifier.

Resistor R3 provides output current limiting in case output terminals are shorted. It is also required to stabilize the amplifier output when driving capacitive loads that are present in the input of the measuring devices.

Resistor network R4, R5 & R6 provides a bias signal to drive the output upscale if input circuit opens with minimal effect during normal operation.

U2 is an isolated DC/DC converter power supply providing ±5 VDC to the operational amplifier circuit. Resistors R4+R5, R7, and capacitors C6, C7 & C8 are used to stabilize the isolated DC/DC converter power supply. U2 maintains isolation between thermocouples when ungrounded thermocouples are used.

U3 is a non-isolated DC/DC converter power supply which enables use on 8-28 VDC power. It provides a fixed 5 VDC to the isolated DC/DC converters. Diode D1 provides protection against reverse voltage and diode D2 provides protection to U2 in the event that the input voltage is lower than the output voltage. Capacitors C9, C10 and C11 stabilize the circuit. Fuse F1 provides circuit protection.

The thermocouple input and output terminal blocks TB1 and TB2 are mounted in very close proximity to one another. Every effort is made to minimize the temperature gradient across them. As the temperature of the terminal blocks is not being measured, any difference between temperature of input and output terminals will cause an error in measurement. The Thermocouple Law of Intermediate Metals applies here which states that a third metal can be used in the thermocouple circuit, as long as the junctions are at the same temperature, and will not affect the EMF of the thermocouple output voltage. In the present case, the copper brass terminal blocks constitute the third metal in the circuit.

As illustrated in FIG. 1, the basic circuit operates on ±5 VDC, but is powered from 8-28 VDC through an isolated DC/DC converter. Multiple isolated circuits (2-8) can be mounted on the same circuit board. Each circuit has its own DC/DC converter to maintain isolation. Power requirements are approximately 200 mW per circuit (8 mA at 24 VDC). Circuit protection is provided by a fuse in the 24 V incoming line, and reverse voltage protection is included. The input/output signals are thermocouple level. Input protection is provided so that accidental application of power (28 VDC) across the input terminals will not damage the circuit. The output has short circuit protection added to limit the signal output power to less than 1 mW for input voltages up to +/−100 mV which is well within the expected thermocouple input voltages.

The thermocouple resistance compensator comprises a buffer operational amplifier with unity gain in which the output exactly tracks the input. The input impedance is very high (>200 GΩ) which reduces the voltage divider effect on the input signal. The output impedance is very low (<100Ω) which makes it compatible with most thermocouple measuring instruments. A failsafe signal is provided to drive the output signal upscale if the input circuit opens.

Input circuit protection is provided so no damage occurs if high voltage (+/−30 Vdc max) is applied to the input. Filtering is added to keep the circuit stable with a high resistance thermocouple connected. The output is stabilized to work with capacitive loads that may be present in the measuring instrument.

The thermocouple resistance compensator is inserted between the thermocouple and the measuring instrument. Connections to the thermocouple resistance compensator input and output terminal blocks are made with thermocouple extension wire. As the thermocouple resistance compensator does not compensate for temperature, no gradient should exist across the input and output connection points. The circuit input and output terminal blocks are placed in very close proximity to each other and surrounded with insulating material. The thermocouple resistance compensator power supply components are kept at a distance from the input and output terminal blocks and at equidistance from the terminal blocks so that any possible waste heat generated by the circuits power supply would heat both sides of the terminal blocks equally. Venting is also provided to aid in preventing temperature differentials across the input and output connections.

Tests were conducted using 10,000 feet of T/C wire (0.125 Type K MIMS cable). It was found that the signal started to degrade over a maximum of 500 ohms. The finer the wire used, the higher the level of resistance in the wire.

The following test results were obtained.

|  | Temp = 200° C. | | Temp = 400° C. | | Temp = 600° C. | |
| --- | --- | --- | --- | --- | --- | --- |
| TC CCT OHMS | Direct Reading | Thermocouple Resistance Compensator Reading | Direct Reading | Thermocouple Resistance Compensator Reading | Direct Reading | Thermocouple Resistance Compensator Reading |
| 0 | 200 | 200 | 400 | 400 | 600 | 600 |
| 100 | 200 | 200 | 400 | 400 | 600 | 600 |
| 500 | 199 | 200 | 399 | 400 | 599 | 600 |
| 1000 | 198 | 200 | 398 | 400 | 598 | 600 |
| 5000 | 186 | 200 | 386 | 400 | 586 | 600 |
| 10000 | 172 | 200 | 373 | 400 | 573 | 600 |
| 15000 | 157 | 200 | 359 | 400 | 559 | 600 |
| 20000 | 143 | 200 | 345 | 400 | 546 | 600 |
| 30000 | 115 | 200 | 318 | 400 | 518 | 600 |
| 40000 | 87 | 201 | 290 | 401 | 491 | 601 |
| 50000 | 60 | 201 | 262 | 401 | 464 | 601 |

The temperature was measured using a typical industrial controller.

The test results illustrate that the controller is indicating erroneous readings and those readings worsen as the loop resistance of the thermocouple increases. The test was conducted on five other products and similar results were obtained. The readings obtained were inaccurate and it depended on the product tested as the errors were not the same on different instruments.

Other instruments where a high loop resistance did not generate any errors were also tested. It all depended on the internal circuitry of the measuring instrument as to whether or not errors appear as the loop resistance increases. It was found that the compensator worked accurately with any instrument.

The compensator is useful when any thermocouple is used having a high resistance. Application may be applied to the nuclear field which use small diameter wire over large distances which have high levels of resistance. It would not be feasible to put in a transmitter to transmit the signal but the compensator of this present invention solves the problems.

Although the invention describes and discloses the preferred embodiment, it is to be understood that it is not so restricted.

The invention claimed is:

1. A thermocouple resistance compensator for use between a thermocouple and a temperature measuring instrument which is adapted to provide an impedance match between the thermocouple and the temperature measuring instrument by presenting a high resistance load for the thermocouple and a low source resistance for the temperature measuring instrument, comprising:
   a buffer operational amplifier which accepts a high resistance input signal from the thermocouple, said buffer operational amplifier having unity gain in which the output tracks the input;
   wherein the buffer operational amplifier accepts the high resistance input signal from the thermocouple and provides the lower source resistance to the temperature measuring instrument with unity gain.

2. A thermocouple resistance compensator as claimed in claim 1 which provides a high input resistance for the thermocouple and a low source resistance for the instrument.

3. A thermocouple resistance compensator as claimed in claim 1 which reduces the measured input impedance of greater than 2,000 ohms to less than 100 ohms.

4. A thermocouple resistance compensator as claimed in claim 1 which is adapted to function with any type of base metal thermocouple.

5. A thermocouple resistance compensator as claimed in claim 1 having input and output terminal block connections made with thermocouple extension wire.

6. A thermocouple resistance compensator as claimed in claim 1 which reduces the input impedance of a high resistance thermocouple to less than 100 ohms.

7. A thermocouple resistance compensator as claimed in claim 1 further including input circuit and reverse voltage protection.

* * * * *